United States Patent
Gebhard et al.

(10) Patent No.: US 8,940,426 B2
(45) Date of Patent: Jan. 27, 2015

(54) APPARATUS FOR ELECTRICAL ENERGY STORAGE

(75) Inventors: Bruno Gebhard, Forchheim (DE); Alexander Hahn, Roettenbach (DE); Norbert Huber, Erlangen (DE); Michael Meinert, Erlangen (DE); Karsten Rechenberg, Dormitz (DE)

(73) Assignee: Siemens Aktiengesellschaft, Munich (DE)

( * ) Notice: Subject to any disclaimer, the term of this patent is extended or adjusted under 35 U.S.C. 154(b) by 364 days.

(21) Appl. No.: 13/499,496

(22) PCT Filed: Jun. 22, 2010

(86) PCT No.: PCT/EP2010/058804
§ 371 (c)(1), (2), (4) Date: Mar. 30, 2012

(87) PCT Pub. No.: WO2011/038946
PCT Pub. Date: Apr. 7, 2011

(65) Prior Publication Data
US 2012/0219837 A1    Aug. 30, 2012

(30) Foreign Application Priority Data
Sep. 30, 2009    (DE) .......................... 10 2009 043 526

(51) Int. Cl.
*H01M 8/04* (2006.01)
*H01M 10/613* (2014.01)
(Continued)

(52) U.S. Cl.
CPC ............. *H01M 10/5004* (2013.01); *H01G 2/08* (2013.01); *H01G 9/0003* (2013.01);
(Continued)

(58) Field of Classification Search
CPC .......... Y02E 60/10; H01M 2/30; H01M 2/32; H01M 10/5051; H01M 2/22; H01M 2/202; H01M 2/26
USPC .................................... 429/120, 121; 361/704
See application file for complete search history.

(56) References Cited

U.S. PATENT DOCUMENTS

| 4,206,273 A | * | 6/1980 | Mandil ........................... 429/65 |
| 5,941,738 A | | 8/1999 | Matsunaga et al. |

(Continued)

FOREIGN PATENT DOCUMENTS

| CN | 1207594 A | 2/1999 |
| CN | 15107771 A | 7/2004 |

(Continued)

OTHER PUBLICATIONS

International Search Report of PCT/EP2010/058804, Dated Aug. 13, 2010.

*Primary Examiner* — Mark F Huff
*Assistant Examiner* — Monique Wills
(74) *Attorney, Agent, or Firm* — Laurence A. Greenberg; Werner H. Stemer; Ralph E. Locher

(57) ABSTRACT

A device stores electric energy, in particular for the traction supply of a rail vehicle. The device has a plurality of chargeable storage cells with cell poles, a cooling body that is in thermal contact with the storage cells, and a plurality of bridge members, by way of which two of the plurality of storage cells are in electric contact. Accordingly, at least some of the bridge members contact the storage cells on the sides thereof facing the cooling body. A bridge member contains a connecting web having two recesses and two connecting parts, each being introduced into one of the recesses. Each connecting part is connected to a cell pole of a storage cell to be contacted. The connecting parts are fixed non-rotatably and non-displaceably in a connecting web by a releasable tensioning device. Thus the efficiency and service life of the energy storage device can be increased by reducing the thermal resistance between the storage cells and the cooling body.

11 Claims, 3 Drawing Sheets

(51) Int. Cl.
*H01G 2/08* (2006.01)
*H01G 9/00* (2006.01)
*H01G 9/008* (2006.01)
*H01G 11/10* (2013.01)
*H01G 11/18* (2013.01)
*H01G 11/76* (2013.01)
*H01M 2/20* (2006.01)
*H01M 10/625* (2014.01)
*H01M 10/6553* (2014.01)
*H01M 10/6554* (2014.01)
*H01M 10/643* (2014.01)
*H01M 10/653* (2014.01)

(52) U.S. Cl.
CPC .............. *H01G 9/016* (2013.01); *H01G 11/10* (2013.01); *H01G 11/18* (2013.01); *H01G 11/76* (2013.01); *H01M 2/206* (2013.01); *H01M 10/5016* (2013.01); *H01M 10/5051* (2013.01); *H01M 10/5053* (2013.01); *H01M 10/503* (2013.01); *H01M 10/504* (2013.01); *Y02T 10/7022* (2013.01); *Y02E 60/13* (2013.01)
USPC .......................................... 429/120; 429/421

(56) References Cited

U.S. PATENT DOCUMENTS

| | | | |
|---|---|---|---|
| 8,507,120 B2* | 8/2013 | Joswig et al. | 429/120 |
| 8,632,898 B2* | 1/2014 | Dougherty et al. | 429/1 |
| 2009/0123820 A1* | 5/2009 | Han | 429/121 |
| 2010/0104936 A1 | 4/2010 | Meintschel et al. | |

FOREIGN PATENT DOCUMENTS

| | | |
|---|---|---|
| CN | 200953355 Y | 9/2007 |
| DE | 100 03 740 C1 | 6/2001 |
| DE | 10 2004 054 060 B3 | 6/2006 |
| DE | 10 2007 010 745 A1 | 8/2008 |
| DE | 10 2007 061 562 A1 | 7/2009 |
| WO | 03/050907 A1 | 6/2003 |

\* cited by examiner

APPARATUS FOR ELECTRICAL ENERGY STORAGE

BACKGROUND OF THE INVENTION

Field of the Invention

The invention relates to an apparatus for electrical energy storage according to the precharacterizing clause of patent claim 1, and to a vehicle, in particular a rail vehicle, according to patent claim 10.

Apparatuses for electrical energy storage are used in particular for the traction supply for vehicles. By way of example, the storage cells are formed by battery or capacitor cells, such as double-layer or hybrid capacitors. The performance and the life of such storage apparatuses are limited substantially by the internal losses and the heating of the storage cells which results from these losses. In order to make it possible to dissipate the heat that is created, the storage cells are in thermal contact with a heat sink in the apparatus.

The use of such energy storage apparatuses for rail vehicles is known from patent specification DE 10 2004 054 060 B4. Laid-open specification DE 10 2007 061 562 A1 discloses the use of such storage apparatuses for a motor vehicle. The disclosed bridge elements are used to make electrical contact between the storage cells, and are arranged on the side of the storage cells facing away from the heat sink.

BRIEF SUMMARY OF THE INVENTION

The invention is based on the object of reducing the thermal resistance between the storage cells and the heat sink in an apparatus of the type mentioned initially, in order to improve the performance and lengthen the life of the storage apparatus.

The object is achieved by an apparatus of this generic type for electrical energy storage having a plurality of storage cells, a heat sink, and a plurality of bridge elements for electrically contacting the storage cells. Accordingly, at least some of the bridge elements make contact with the storage cells on their side facing the heat sink, as a result of which these bridge elements form a thermal contact surface facing the heat sink, which extends close to the heat sink and along its shape. The size of and the short distance between the two co-extensive, thermally acting surfaces reduce the thermal resistance between the storage cells and the heat sink. Furthermore, a bridge element has a connecting web with two recesses and two connecting parts which are each inserted into one of the recesses. In this case, each connecting part is connected to a cell pole of a storage cell with which contact is to be made. In consequence, heat is passed from the storage cells into the connecting parts, and is dissipated from there to the heat sink, partially directly and partially via the connecting web. The connecting parts are fixed in the recesses in the connecting web by means of a detachable clamping device such that they cannot rotate or move linearly. Good heat transfer between these components is promoted by force-fitting bracing of the connecting web to the connecting pieces. Overall, this results in an improved thermal link between the storage cells and the heat sink of the apparatus. In addition, the clamping device advantageously ensures on the one hand that a bridge element is held together, and on the other hand effectively prevents, for example, a screw connection between the bridge element and the storage cell becoming loose. Finally, a good electrical contact is made in this way between the connecting parts and the cell poles, which is otherwise possible only by welded bridge elements.

In one advantageous embodiment of the apparatus according to the invention, the connecting part makes contact at least in places directly with the cell surface. For example, when there is a screw connection between the bridge element and the storage cell, there is no need for locking rings and other screw securing means which prevent direct contact between a connecting part and the cell surface. The direct contact between the bridge element and the cell surface via the connecting parts further improves the thermal contact between the storage cells and the bridge elements.

In one preferred refinement of the apparatus according to the invention, the clamping device is formed by a slot, which connects the recesses, in the connecting web and by a screw which passes through this slot such that the recesses can be deformed by rotating the screw between a clamping position, which fixes the connecting parts, and a releasing linear movement position. This makes it possible to close or release the clamping connection between the connecting part and the connecting web with the aid of simple tools, for example a screwdriver or a hexagonal wrench. After the clamping connection has been released, a connecting part can be attached to the cell pole, or detached from it, or else the position of the connecting web can be varied.

In one advantageous refinement of the apparatus according to the invention, the recesses and/or the connecting parts have a tooth system on their clamping surface. This enlarges the contact area between the connecting part and the connecting web, thus improving the friction lock of the clamping connection and the thermal link.

In one preferred embodiment of the apparatus according to the invention, the bridge element and the heat sink are held at a defined minimum distance apart by means of an electrical insulating piece which is seated centrally on the connecting web. In addition to its separating function, the shape of the insulating piece defines the creepage distance and therefore its electrical insulation resistance, which ensures the long-term withstand voltage of the arrangement.

In another advantageous embodiment of the apparatus according to the invention, the distance between the bridge element and the heat sink can be adjusted by varying the insertion depth of the connecting parts into the recesses in the connecting web. The capability to adjust the distance between a bridge element and the heat sink advantageously makes it possible to compensate for manufacturing and assembly-dependent tolerances, which have led to different distances between the cell poles and a heat sink which is in the form of a plate. All that is necessary to do this is simply to push the connecting web to a greater or lesser extent over the connecting parts before the clamping connection is closed, thus producing the required distance from the heat sink. Because of the compensation for the height tolerances, the thermal contact surface formed by the bridge elements can be guided closely on the heat sink, thus leading to a further improvement in the heat dissipation from the storage cells.

In another advantageous refinement of the apparatus according to the invention, a compressible and thermally conductive electrical insulating film is placed between the bridge elements and the heat sink. Any gaps which may still exist between the bridge elements and the heat sink are bridged by a film composed, for example, of thermally conductive plastic. Because of the tolerances, which are very largely compensated for by appropriate positioning of the connecting webs relative to the connecting parts, this electrical insulation film can be made very thin, as a result of which its thermal resistance is also low.

In another preferred embodiment of the apparatus according to the invention, bridge elements which make contact with storage cells on their side facing the heat sink are shaped, and are arranged in a regular pattern, such that they form as large a thermal contact area with the heat sink as possible. On the one hand, the connecting parts together with the connecting web preferably form a closed thermal contact surface, which faces the heat sink. The arrangement of the plurality of storage cells to form an overall assembly of the apparatus results in a regularly distributed pattern of bridge elements. By appropriate shaping of the bridge elements, in particular of the connecting webs, these form a thermal overall surface with only small gaps. This can be achieved, for example, by connecting webs in the form of spectacles with a symmetrical or asymmetric dumbbell shape, in conjunction with angled or outward-bulging external contours. This further maximizes the thermal contact area with the heat sink, and therefore the capability to dissipate heat from the storage cells.

In another preferred refinement of the apparatus according to the invention, the connecting parts and the recesses are cylindrical, and the connecting parts have holes at the end, for fitting a torque tool. By way of example, a connecting part may be a round nut in the form of a cylindrical disk which fits into the hollow-cylindrical recess in the connecting web. Two blind holes are drilled in the top surface of the disk in order to firmly tighten the screw connection to the cell pole, and are provided with two pins for attaching a torque tool.

An apparatus for electrical energy storage as defined above is advantageously used for the traction supply in a vehicle, in particular a rail vehicle.

Further advantages and characteristics of the energy storage apparatus according to the invention will become evident from the following description of the drawings, in which:

DESCRIPTION OF THE INVENTION in each case illustrated schematically.

Figure 1:
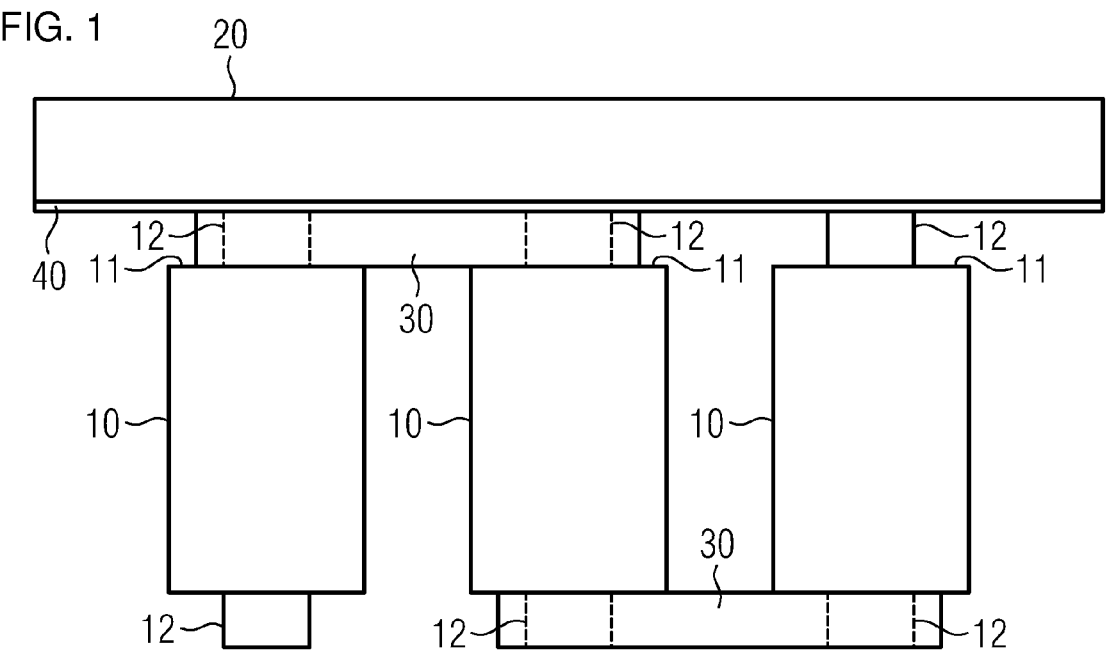
FIG. 1 shows a side view of a storage apparatus according to the invention.

As shown in FIG. 1, an apparatus according to the invention for electrical energy storage has an assembly comprising cylindrical storage cells 10, which are in the form of double-layer or hybrid capacitors and are therefore designed to receive, store and output electrical energy as required. The electrical voltage of a storage cell 10 is tapped off via cell poles 12, which project from the cell surface 11 on opposite end faces of a storage cell 10. In order to dissipate the heat which is created during operation of the storage cells 10, a heat sink 20 in the form of a plate is arranged at least on one side of the cell assembly and, for example, a cooling medium flows through it, in a manner known per se. Depending on the total voltage to be produced, the storage cells 10 are connected electrically in series and partially in parallel. For this purpose, the cell poles 12 make electrical contact with two storage cells 10 to be connected, via a bridge element 30. Bridge elements 30 can be arranged on the side of the storage cells 10 facing away from the heat sink 20. According to the invention, however, bridge elements 30 are arranged in particular on the side of the storage cells 10 facing the heat sink 20 since not only can the electrical contact between the storage cells 10 be made via them, but the heat to be dissipated from the storage cells 10 can also be passed on via them to the heat sink 20. In order to electrically isolate the bridge elements 30 from the heat sink 20, a compressible insulating film 40 is placed between them, consisting of a plastic with a low thermal resistance.

According to FIG. 2 and FIG. 5 to FIG. 8, a bridge element 30 designed according to the invention has an elongated connecting web 31 which bridges at least the distance between the cell poles 12 of two adjacent storage cells 10. Symmetrically with respect to a center plane of the connecting web 31, this has two hollow-cylindrical recesses 32 in the form of through-holes.

A connecting part 33 as shown in FIG. 2 to FIG. 5, and in the form of a cylindrical disk, is inserted with immaculate fit into each of the recesses 32. The connecting part 33 has a central threaded hole 34, which is intended for interlocking and force-fitting screw connection to a cell pole 12. The cell pole 12 is in the form of a threaded bolt with a corresponding external thread. The end surface of the connecting part 33 has two holes 35, which are in the form of blind holes and are used as attachment points for a screwdriving tool for attaching the connecting part 33 to the cell pole 12. According to the invention, the connecting parts 33 are screwed tight to the cell surface 11, until they make direct contact with the connecting part 33. This achieves better heat transfer from the storage cell 10 to the bridge element 30, based not only on the threaded contact but on an area contact between the connecting part 33 and the end cell surface 11.

Figure 2:
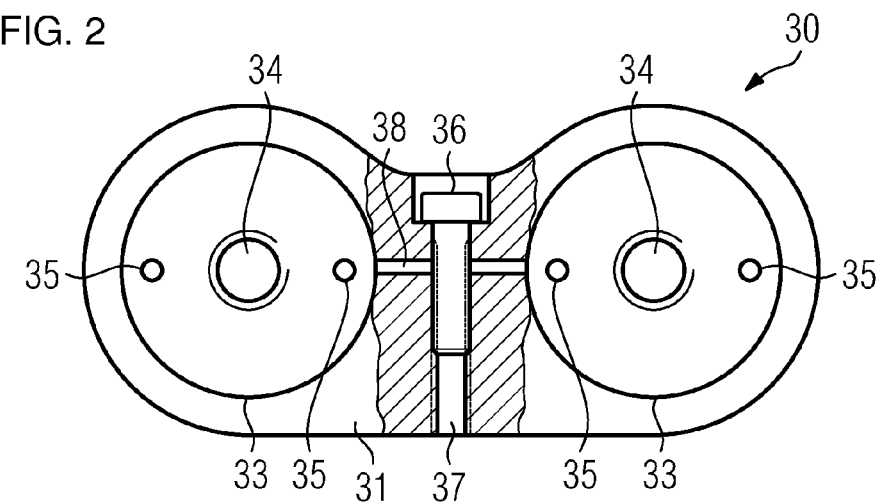
FIG. 2 shows a plan view of a partially sectioned bridge element.
Figure 3:
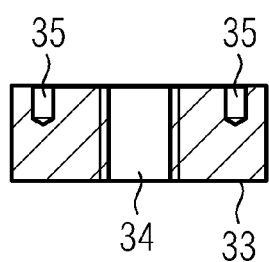
FIG. 3 shows a transversely sectioned side view of a connecting piece.
Figure 4:
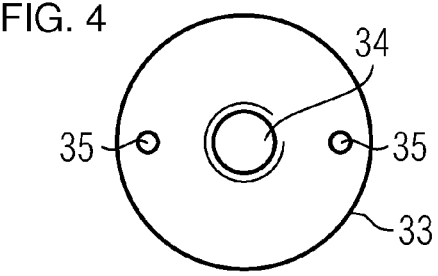
FIG. 4 shows a plan view of a connecting piece.

According to the invention, a clamping device as shown in FIG. 2 is provided in order to fix the connecting parts 33 in the recesses 32 in the connecting web 31 such that they cannot rotate or move linearly. This clamping device is formed by a slot 38, which connects the recesses 32, in the connecting web 31 and by a screw connection which passes transversely through the slot. The screw connection comprises a through-hole with an internal thread 37, which extends centrally between the two recesses 32 and essentially at right angles to the slot 38.

When a screw 36 is screwed into the internal thread 37, the width of the slot 38 is reduced, as a result of which the diameter of the recesses 32 is reduced—advantageously at the same time—until the connecting parts 33 are clamped firmly in their recesses 32. In this clamping position, on the one hand the connecting part 33 cannot rotate, thus securing the connection to the cell pole 12. On the other hand, the connecting part 33 cannot be moved axially in the recess 32, as a result of which the connecting web 31 is secured against becoming loose. The clamping seat of the connecting parts 33 in the recesses 32 also ensures good heat transfer between the connecting part 33 and the connecting web 31, thus overall reducing the thermal resistance of the bridge element 30.

When the screw 36 is unscrewed, this reverses the deformation of the recesses 32 again, and changes the clamping position of the recesses 32 to a releasing linear movement position in which the distance between a connecting web 31 and the heat sink 20 can be adjusted. This makes it possible to compensate for manufacturing and assembly-dependent tolerances in the distance between the cell poles 12 and the heat sink 20, thus making it possible to provide a thermal contact surface, at the same level, composed of bridge elements 30 at a defined distance from the heat sink 20.

Figure 5:
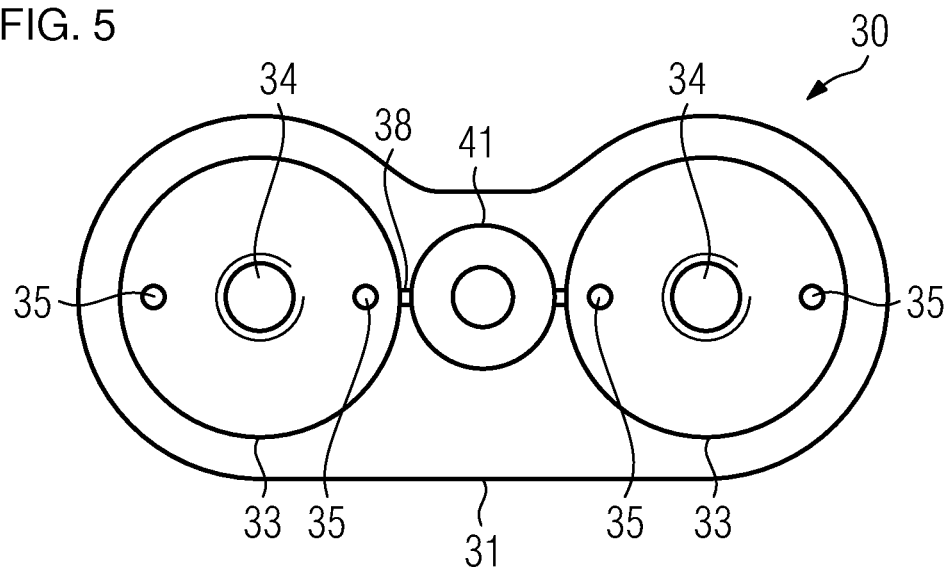
FIG. 5 shows a plan view of a bridge element with an insulating piece.
Figure 6:
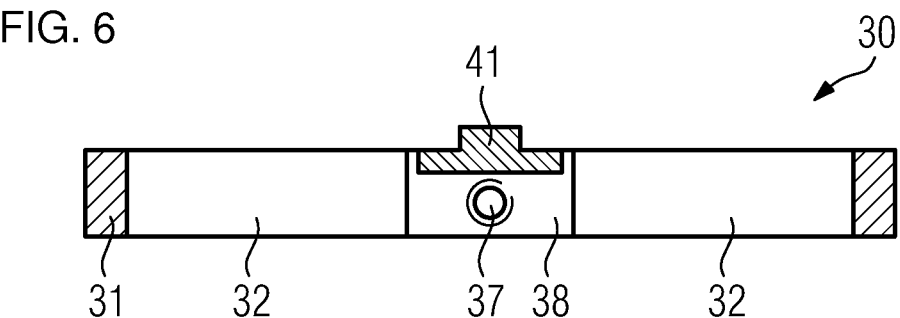
FIG. 6 shows a transversely sectioned side view of a connecting web with an insulating piece.

In order to ensure that this distance is not less than a predeterminable minimum, as is shown in FIG. 5 and FIG. 6, an insulating piece 41 is placed centrally on the connecting web 31, on the side of the bridge element 30 facing the heat sink 20. The insulating piece 41 is manufactured from electrically non-conductive material, and is in the form of a flat disk with a central attachment. The insulating piece 41 is mounted in a cylindrical milled-out area in the connecting web 31. The height of the attachment determines the minimum distance to the heat sink 20. The thickness of the compressible insulating film 40, and therefore its thermal resistance, can be reduced by the defined adjustable distance between the bridge elements 30 and the heat sink 20.

Figure 7:
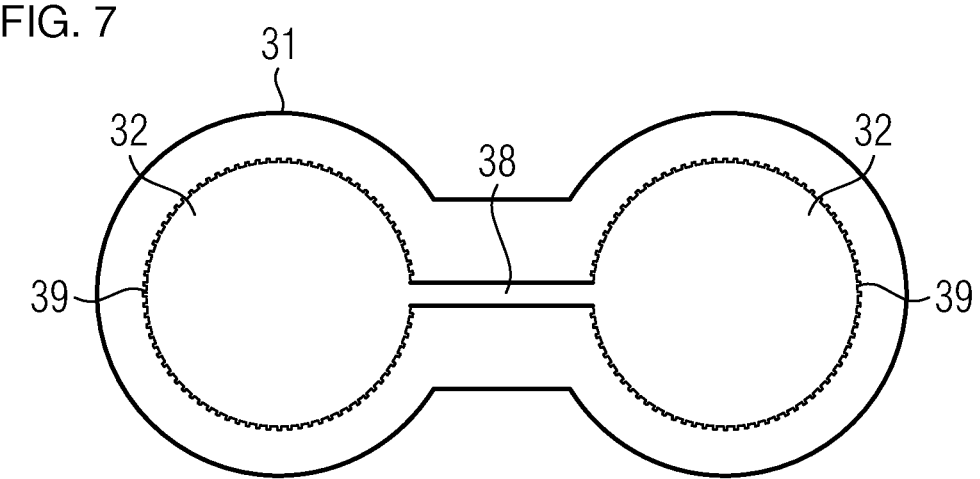
FIG. 7 shows a plan view of a connecting web with a tooth system.

In the embodiment illustrated in FIG. 7, the connecting web 31 has a tooth system 39 on the clamping surfaces of the recesses 32, which tooth system 39 increases the friction lock, and therefore the thermal contact between the connecting parts 33 and the connecting web 31. Alternatively or at the same time, the connecting parts 33 can likewise have a tooth system on their clamping surfaces.

Figure 8:
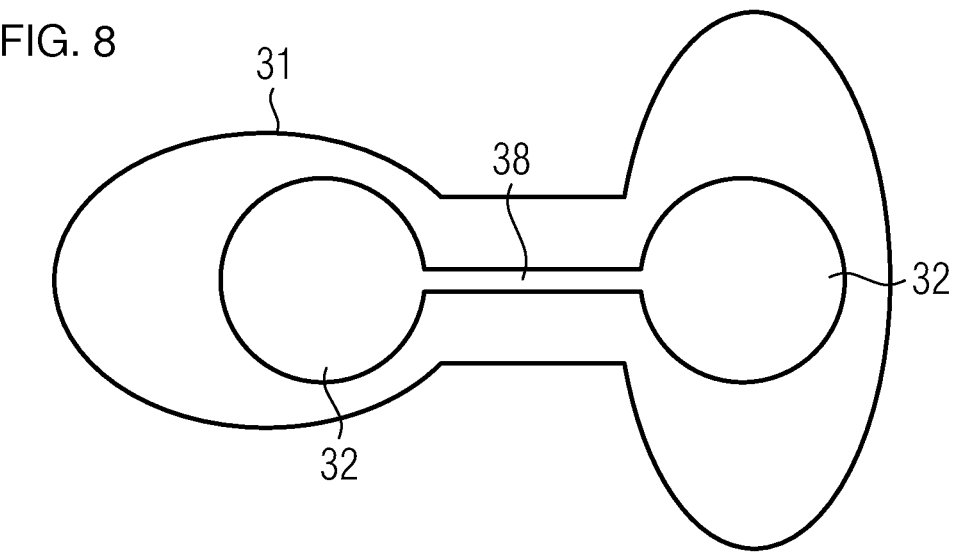
FIG. 8 shows a plan view of an alternatively shaped connecting web.

The connecting web 31 shown in FIG. 8 differs from the previous web by the asymmetric shape. The part of the connecting web 31 which surrounds the recesses 32 is in this case elliptical or egg-shaped, with the major half axes of the ellipses being rotated through 90° with respect to one another. Indentations are formed in the area of the slot 38 between the ellipses. If the bridge elements 30 are located appropriately, for example with elliptical outward bulges on a bridge element 30 being able to engage in indentations in adjacent bridge elements 30, large gaps are avoided between adjacent bridge elements 30 thus, overall, providing a large thermal contact area with the heat sink 20, with low thermal resistance.

The invention claimed is:

1. An apparatus for electrical energy storage for a traction supply of a vehicle, including a rail vehicle, the apparatus comprising:
   a plurality of chargeable storage cells each having a cell surface and a cell pole projecting from said cell surface;
   a heat sink making thermal contact with said storage cells; and
   a plurality of bridge elements via which in each case two of said plurality of storage cells are in electrical contact, at least some of said bridge elements making contact with said storage cells on a side facing said heat sink, each of said bridge elements having a detachable clamping device, a connecting web with two recesses formed therein, and two connecting parts each inserted into one of said recesses, wherein each of said connecting parts is connected to said cell pole of a respective one of said storage cells with which contact is to be made, said connecting parts are fixed in said recesses in said connecting web by means of said detachable clamping device such that said connecting parts cannot rotate or move linearly.

2. The apparatus according to claim 1, wherein said connecting parts make contact at least in places directly with said cell surface.

3. The apparatus according to claim 1, wherein said connecting web has a slot formed therein, said clamping device is formed by said slot, which connects said recesses, in said connecting web and by a screw passing through said slot such that said recesses can be deformed by rotating said screw between a clamping position, which fixes said connecting parts, and a releasing linear movement position.

4. The apparatus according to claim 1, wherein at least one of said recesses or said connecting parts have a tooth system on a clamping surface.

5. The apparatus according to claim 1, further comprising an electrical insulating piece, said bridge elements and said heat sink are held at a defined minimum distance apart by means of said electrical insulating piece which is seated centrally on said connecting web.

6. The apparatus according to claim 1, wherein a distance between said bridge elements and said heat sink can be adjusted by varying an insertion depth of said connecting parts into said recesses in said connecting web.

7. The apparatus according to claim 1, further comprising a compressible and thermally conductive electrical insulating film disposed between said bridge elements and said heat sink.

8. The apparatus according to claim 1, wherein said bridge elements are shaped, and are disposed in a regular pattern, such that said bridge elements form a thermal contact area with said heat sink.

9. The apparatus according to claim 1, wherein said connecting parts and said recesses are cylindrical, and said connecting parts have holes formed therein at an end, for fitting a torque tool.

10. A vehicle, comprising:
    an apparatus for electrical energy storage, said apparatus containing:
      a plurality of chargeable storage cells each having a cell surface and a cell pole projecting from said cell surface;
      a heat sink making thermal contact with said storage cells; and
      a plurality of bridge elements via which in each case two of said plurality of storage cells are in electrical contact, at least some of said bridge elements making contact with said storage cells on a side facing said heat sink, each of said bridge elements having a detachable clamping device, a connecting web with two recesses formed therein, and two connecting parts each inserted into one of said recesses, wherein each of said connecting parts is connected to said cell pole of said storage cell with which contact is to be made, said connecting parts are fixed in said recesses in said connecting web by means of said detachable clamping device such that said connecting parts cannot rotate or move linearly.

11. A rail vehicle, comprising:
    an apparatus for electrical energy storage, said apparatus containing:
      a plurality of chargeable storage cells each having an end cell surface, a side surface and a cell pole projecting from said end cell surface;
      a heat sink making thermal contact with said storage cells; and
      a plurality of bridge elements via which in each case two of said plurality of storage cells are in electrical contact, at least some of said bridge elements making contact with said storage cells on a side facing said heat sink, each of said bridge elements having a detachable clamping device, a connecting web with two recesses formed therein, and two connecting parts each inserted into one of said recesses, wherein each of said connecting parts is connected to said cell pole of said storage cell with which contact is to be made and directly contacting said end cell surface, said connecting parts are fixed in said recesses in said connecting web by means of said detachable clamping device such that said connecting parts cannot rotate or move linearly.

* * * * *